(12) United States Patent
Lauper

(10) Patent No.: US 7,397,345 B2
(45) Date of Patent: Jul. 8, 2008

(54) METHOD AND VEHICLE FOR SENDING ELECTRONIC ADVERTISEMENTS

(75) Inventor: Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 269 days.

(21) Appl. No.: 11/257,707

(22) Filed: Oct. 25, 2005

(65) Prior Publication Data

US 2006/0116070 A1 Jun. 1, 2006

(30) Foreign Application Priority Data

Oct. 26, 2004 (EP) .................................. 04105302

(51) Int. Cl.
*G08B 5/22* (2006.01)
*H04Q 1/30* (2006.01)
*H04Q 7/00* (2006.01)

(52) U.S. Cl. .................... 340/7.48; 340/7.51; 340/539.1

(58) Field of Classification Search ........................ None
See application file for complete search history.

(56) References Cited

U.S. PATENT DOCUMENTS

| | | | | |
|---|---|---|---|---|
| 5,847,679 A * | 12/1998 | Yee et al. | ................ | 342/357.07 |
| 6,018,659 A * | 1/2000 | Ayyagari et al. | ............. | 455/431 |
| 6,084,510 A * | 7/2000 | Lemelson et al. | ...... | 340/539.13 |
| 6,236,330 B1 | 5/2001 | Cohen | | |
| 6,681,157 B2 * | 1/2004 | Kageyama | ....................... | 701/1 |
| 6,804,515 B1 * | 10/2004 | McCraw et al. | .............. | 455/431 |
| 6,868,314 B1 * | 3/2005 | Frink | ............................. | 701/3 |
| 6,928,270 B2 * | 8/2005 | Tighe | ........................ | 455/90.1 |
| 6,968,187 B1 * | 11/2005 | Irwin et al. | .................. | 455/431 |
| 7,171,126 B2 * | 1/2007 | Cicchiello et al. | ........... | 398/129 |
| 7,254,567 B2 * | 8/2007 | Jha | ................ | 707/1 |
| 7,299,130 B2 * | 11/2007 | Mulligan et al. | ............ | 701/213 |
| 2003/0164794 A1 * | 9/2003 | Haynes et al. | .............. | 342/353 |
| 2004/0049960 A1 | 3/2004 | Percy | | |
| 2004/0068439 A1 | 4/2004 | Elgrably | | |
| 2004/0203563 A1 * | 10/2004 | Menard | .................... | 455/404.1 |
| 2006/0074557 A1 * | 4/2006 | Mulligan et al. | ............ | 701/213 |

FOREIGN PATENT DOCUMENTS

| | | |
|---|---|---|
| FR | 2 827 107 A | 1/2003 |
| JP | 2003263123 | 9/2003 |
| WO | WO2004/072933 A1 | 8/2004 |

* cited by examiner

*Primary Examiner*—Benjamin C. Lee
*Assistant Examiner*—Son Tang
(74) *Attorney, Agent, or Firm*—Pearne & Gordon LLP

(57) ABSTRACT

A method and a vehicle (11) for sending electronic advertising announcements, information news or voice messages are described. A controllable, moving, unmanned vehicle (11) moves in a network of communication devices (9, 20) in a direction. When the vehicle (11) moves close to a communication device (9, 20) the sending of an electronic advertising announcement, information news or voice message to the communication device (9, 20) is triggered by the vehicle (11) itself or by another communication device (1), for example by a message server (1) within a telecommunication network (8). The vehicle (11) itself has a memory area (14) for storing the electronic advertising announcements and at least one interface for sending these messages to another communication device (9, 20).

27 Claims, 1 Drawing Sheet

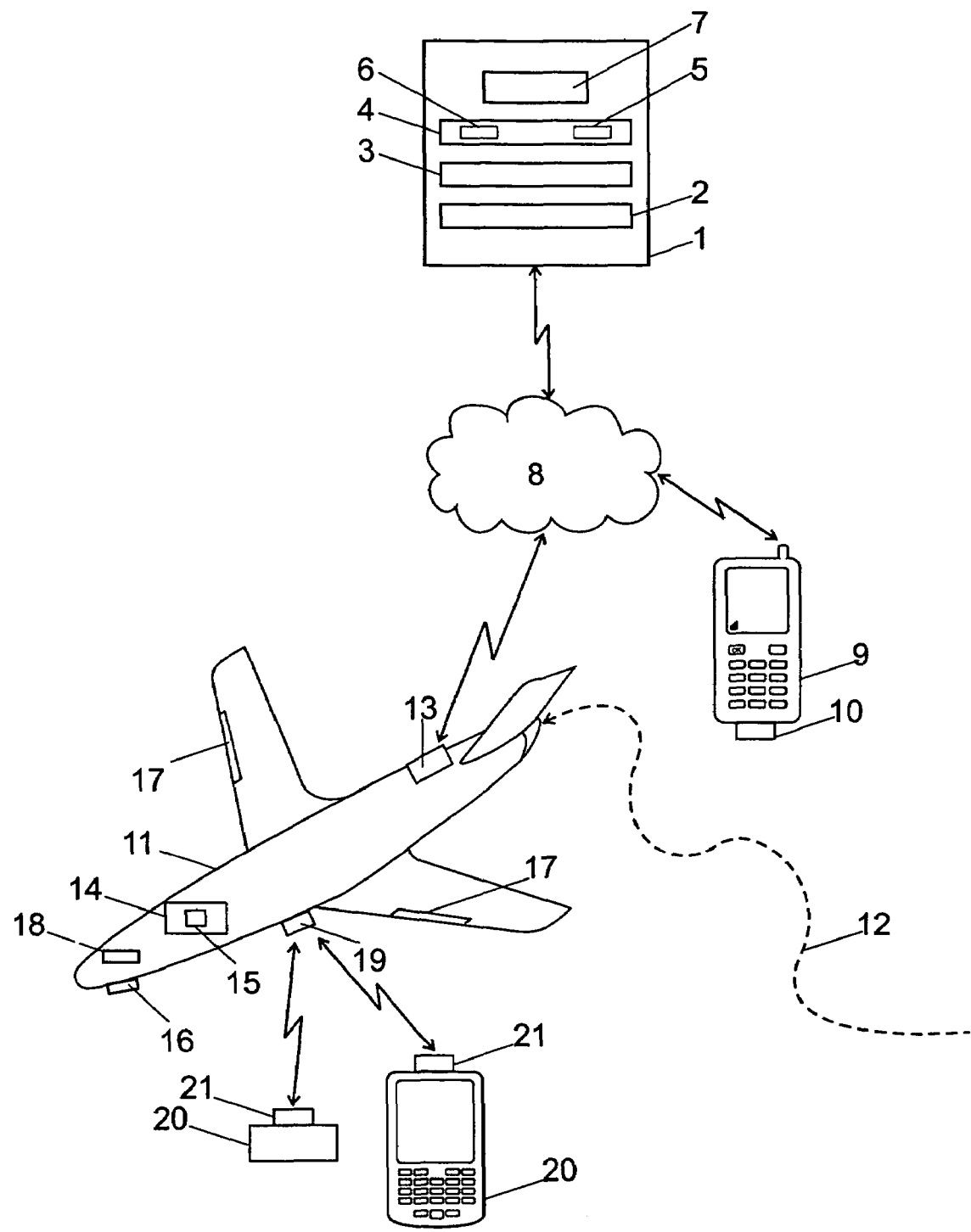

METHOD AND VEHICLE FOR SENDING ELECTRONIC ADVERTISEMENTS

REFERENCE DATA

This application claims priority of European patent application 2004EP-105302, filed on Oct. 26, 2004, the contents of which are hereby incorporated by reference.

TECHNICAL FIELD

The invention relates to a method and a vehicle for sending electronic advertising announcements, information news or voice messages according to the independent claims.

RELATED ART

In the prior art, different systems for distributing information and different advertising supports are known. It is known for airplanes trailing an advertising banner to circle over an event and in this manner inform the visitors about a certain product.

Furthermore, patent US-B1-6,428,383 for example discloses a remote-controlled toy car with one or several audio exits. The toy car contains for example a tape recorder, a CD player or a radio. As soon as the user has selected the desired music or advertisements, it is possible by remote control to lead the vehicle to the vicinity of an event and to entertain the people present there in this manner, to inform them about news, etc. Speed and the target can be set and reached with the aid of the remote control. Additionally, the car can be provided with a horn, special lights, a clock or timer. Less advantageous in this embodiment is however that the announcements must be set in advance and can only be modified when the car returns to the operator. It is also not possible to distribute the news electronically.

European patent application EP-A1-1 195 701 discloses a method for sending advertising messages or banners that can also contain audio elements. The messages are sent to the users of mobile telephones over a mobile radio network.

An electronic advertising poster is known from document U.S. Pat. No. 5,966,696. The advertising post has a resting mode and an active mode. In the resting mode, preprogrammed elements that do not contain advertising are played. As soon as a person moves closer to this advertising poster and a movement sensor detects this person, the poster automatically switches to the active mode and plays a predefined colorful advertising program that can also include audio parts. In order to determine which advertising broadcasts are preferred by the users, a record is kept of which program was played and how long the program was watched. In this embodiment too, it is unfortunately not possible to transmit electronic messages.

A similar method and system is known from French patent application FR-A1-2 827 107. An electronic advertising panel, that is provided with a sender station, automatically detects persons that find themselves in the vicinity of the advertising panel. The sender station is integrated within a mobile radio network such as GSM, UTMS or with another transmission procedure such as Bluetooth or DECT. As soon as a person connected to the same mobile radio network or to the transmission procedure, comes near the advertising panel, predefined advertising announcements or other electronic messages for example are sent via SMS etc. A connected central computer unit monitors the sending of the advertising messages and is used for determining statistical data or costs. Since the system is stationary, it is however only possible to transmit messages when the target person finds himself in the corresponding sector of the advertising panel.

REPRESENTATION OF THE INVENTION

It is an aim of the invention to overcome the disadvantages of the prior art systems and methods and to propose a method and device with which electronic advertising announcements, information news or voice messages can be sent to a large number of mobile or communication devices located in different places. It should be possible to subsequently modify the electronic advertising messages without great effort.

According to the invention, this is achieved according to the independent method claim in that electronic advertising announcements, information news or voice messages are sent by means of a controllable moving unmanned vehicle, the inventive method comprising the following method steps:

the vehicle moves in a network of communication devices in one direction and when the vehicle moves closer to a communication device, the sending of an electronic advertising announcement, information news item or voice message to the communication device can be triggered by the vehicle itself or by another communication device.

According to the invention, said task is also solved by a vehicle with the characteristics mentioned in the independent claim 20.

The vehicle can for example send the electronic advertising announcement, information news item or voice message by means of an interface such as Bluetooth, DECT, WLAN, RFID or another suitable interface to an electronic communication device in the vicinity such as a computer, portable computer, headphones, mobile telephone, Bluetooth, game consoles or PDAs, or the vehicle is identified by a message server as said other communication device within a telecommunication network such as GSM or UMTS and the message server detects both the position of the vehicle as that also of mobile devices located in the vicinity of the vehicle. In this manner, the message server and/or the vehicle can send said advertising announcements, information news or voice messages to these mobile devices over the telecommunication network.

The message server and/or the vehicle can send the advertising announcement, information news item or voice message to all mobile devices located in the vicinity of the vehicle as a broadcast message or only to mobile devices located in the vicinity of the vehicle whose users have subscribed a certain service, who have a specific user profile or who have a certain characteristic. Subscribed services, such as weather news, the drawn lotto numbers or information about products for sale can easily be transmitted in said manner. An advertising message could be sent in the form of a SMS or USSD, as e-mail, as IP packet, as files or web pages. They could also be messages that contain multimedia files, i.e. songs (mp3), films, videos etc.

As such a vehicle, for example, an airplane or model or micro aircraft, a helicopter or model or micro helicopter, a balloon, a car or a toy car, a boat or a robot or another moving, controllable, autonomous and unmanned vehicle could be suitable. Flying micro-robots are also known that weigh less than 100 grams and preferably less than 20 grams, and that are designed in particular to fly indoors. Such a robot can also make decisions autonomously in order to change direction or to manage and send or transmit messages. It is an advantage if such a vehicle can move relatively fast and it would be possible to have the vehicle fly also over visitors of an event in order to inform them through the advertising announcements.

If someone for example wishes to rent the vehicle for advertising purposes, he could advantageously send instructions regarding the circle of recipients and the contents of the advertising announcement to be sent to the message server or to the vehicle, and the latter effects the distribution of the advertisement in the manner described. According to the purpose of its use, it would be possible to bill or credit this message to the recipient of such an electronic advertising announcement.

According to the invention, electronic advertising announcements can advantageously be sent to a large number of people having a corresponding mobile device or a communication device and who are in different locations. Since it is also possible to spontaneously modify the electronic message over the already mentioned message server, it is not necessary for the vehicle to return to a base station to exchange or modify the advertisement to be sent or the information.

SHORT DESCRIPTION OF THE DRAWING

The invention will be described in more detail on the basis of the single FIGURE showing a telecommunication system with which the inventive method can be performed. Only the elements needed for understanding the invention are represented.

WAYS OF EXECUTING THE INVENTION

The single FIGURE shows a telecommunication system with a message server 1 in a telecommunication network 8 and with which the inventive method for sending advertising announcements can be performed.

The message server 1 is a fixed device in the telecommunication network 8. The message server 1 comprises a module 2 that connects the message server 1 with the telecommunication network 8 and with which advertising announcements can be received and sent. Advertising announcements in general will include hereinafter advertising announcements, information news or voice messages having the purpose of distributing information. Furthermore, the message server 1 includes a location determining system 3 or can fall back on such a system. The location is thus determined either in the telecommunication network 8 (for example on the basis of signals from the base stations) or in the mobile devices 9, if they are provided with satellite-controlled location determining means (GPS).

The message server 1 further comprises a memory area 4. Said telecommunication network 8 is a known mobile radio network such as GSM or UMTS. It could however also be another suitable network that could fulfill the same functions.

As communication devices 9, different mobile devices of different mobile users are connected to the telecommunication network 8. A mobile device 9 has a memory area with an identification module 10 in which the personal data of the mobile user are stored and which identify the user in the telecommunication network 8.

A controllable and unmanned vehicle 11 is also integrated in the telecommunication network 8. As such a vehicle 11, for example, an airplane or model or micro aircraft, a helicopter or model or micro helicopter, a balloon, a car or a toy car, a boat or a robot or another moving, controllable, autonomous and unmanned vehicle suitable for the purpose described here could be suitable. Flying micro-robots are also known that weigh less than 100 grams and preferably less than 20 grams, and that are designed in particular to fly indoors. Such a robot can also make decisions autonomously in order to change direction or to manage and send or transmit messages.

As is visible in the single FIGURE, the vehicle 11 moves on a trajectory 12 along a particular route or in a direction that is to be defined in further detail. The vehicle 11 also has an identification module 13 with which it is integrated and identified in said telecommunication network 8. The vehicle 11 can thus, just like said mobile devices 9, send and receive electronic messages over the telecommunication network 8. In order to able to orient itself, the vehicle 11 comprises some sensors 16 that allow the vehicle 11 to detect obstacles on its trajectory 12. Are suitable as sensors 16 for example ccD-sensors, sonars, touch sensors, acceleration sensors, beacons, etc. or other sensors that can be used for this purpose. The vehicle 11 further has one or several units 17 for determining and correcting the chosen direction and a power supply unit 18. According to the above-mentioned vehicles 11, the power supply unit 18 can be a tank with petrol, hydrogen, gas or it can be powered by means of solar energy, batteries or accumulators or another fuel. It is conceivable that the vehicle 11, to refuel, returns to a service station not represented in the single FIGURE.

The vehicle 11 can further have a contactless interface 19, for example over BlueTooth, DECT, WLAN or a RFID interface. With this interface, it can communicate at close range with other communication devices 20. The communication devices 20 also have such a contactless interface 11 at close range and the vehicle 11 thus has the possibility, as soon as it finds itself in the PAN (Personal Area Network), to send to a communication device 20 an advertising announcement or to receive a message from such a device 20. As communication device 20, a computer, portable computer, headphones, mobile telephone, Bluetooth, game consoles or PDAs, or other devices connected to a RFID interface could be conceivable.

According to the invention, it is thus possible on the one hand for the message server 1 to determine, continuously or at certain time intervals, with its location determining system 3 the current position of the vehicle 11 and simultaneously detect the mobile devices 9 located in the vicinity of the vehicle 11 that are each provided with an identification module 10. It is then possible to send said electronic advertising announcements to the mobile devices 9 determined by the location determining system 3 over said module 3 of the message server 1 and over the telecommunication network 8. It is conceivable that the electronic advertising messages are sent directly by the message server 11. The vicinity of the vehicle 11 thus triggers the sending of an electronic advertising announcement to the mobile devices 9. Among the mobile devices 9 located in the vicinity, one will understand those that are within sight or hearing distance to the vehicle 11. It is however also conceivable that the vehicle 11 sends itself the electronic advertising announcements over the telecommunication network 8 and the message server 1 to the identified mobile devices 9.

According to the invention, it is also possible for the vehicle 11 to send an electronic advertising announcement to a communication device 20 that is located in the vicinity of the vehicle 11 over said contactless interfaces 19, 21. In this embodiment, the range of the contactless interface 19, 21 determine the distance of the vehicle 11 to the communication device 20. The electronic advertising announcements in the sense of this invention could be sent (or received) as SMS, USSD, e-mail, IP packet, files or web pages by the message server 1 or by the vehicle 11. They could also be messages that contain multimedia files, i.e. songs (mp3), films, videos etc.

In the sense of the present invention, the vehicle 11 moves in a network of communication devices 9, 20 and when the vehicle 1 moves closer to one of said communication devices 9, 20, the sending of an electronic advertising announcement, information news or voice message to the communication device 9, 20 is triggered by the vehicle 11 itself or by another communication device, i.e. for example by the message server 1.

During the trajectory 12 traveled by the vehicle 11, the message server 1 and/or the vehicle 11 could then send an electronic advertising announcement to all mobile devices 9 or communication devices 20 located in the vicinity in the sense of a broadcast SMS. In this sense, a broad distribution of advertising announcements, information news or voice messages to all mobile devices 9 or communication devices 20 located in the vicinity of the vehicle can be performed in order to inform the users of these devices. This can for example be during an event where the users receive current program indications, other information or product advertising. During a traffic jam on the motorway, for example, a model aircraft can fly over the cars and inform the drivers about the length of the congestion, about waiting times or recommend early to leave the motorway at the next exit. For the vehicle 11 to be better noticed, it could be useful to draw attention to it either continuously or at certain points in time during its movement, with acoustic or optical means such as lights and signaling beeps etc.

Similarly, the electronic advertising announcements can be send only to the mobile devices 9 or communication devices 20 located in the vicinity of the vehicle and whose user have subscribed a particular service, who have a particular user profile or have certain characteristics. It is thus conceivable to inform only the users of mobile devices 9 who have a specific brand or a particular model. The owners then receive by means of the vehicle 11 for example information about product-specific innovations. Subscribed services, such as weather news, the drawn lotto numbers or information about products for sale can also easily be transmitted in said manner.

The route of the vehicle 11 must of course be adapted to the current use purpose. It can for example move along a predefined and preprogrammed route and be controlled through a module 6 in the memory area 4 of the message server 1 through means known per se. An explicit target or an explicit route is thus given. Such a module 15 for determining the direction can however also be located in a memory area 14 of the vehicle 11. The vehicle 11 could take into account on its trajectory 12 for example all users in a town or in a place who have subscribed an information news service.

On the other hand, the vehicle 11 can move in a direction or along a route that changed after certain events or is adapted accordingly. If no further mobile devices 9, communication devices 20 or other devices that are willing and capable of receiving advertising announcements can be found for a period of time along a route or in a certain direction and its trip thus becomes meaningless, it could receive from itself or through the message server 1 a command to change direction. An "intelligent" vehicle 11 could store certain recurring events, so that it can send in a certain area at a certain time very many electronic advertising announcements and at another point in time somewhat less. It processes this and other information and adapts its route or direction of movement accordingly. It is also conceivable that the vehicle 11 moves in a direction or along a route that remains at least constant or that increases in the density of mobile devices 9 or communication devices 20, and wherein it can send in this manner more electronic advertising announcements. It could also move in a direction in which certain characteristics of the sender or receiving devices change, i.e. a certain brand or model of mobile devices 9 could for example be present more often in a certain direction. Another possibility would be to device the route in such a manner that an advertising announcement be sent to as many interested parties as possible. The sending could be triggered by other events, such as time, absolute location, content of a website or on express command. A vehicle 11 could also design the messages itself or at least partially itself, such as for example through recording images through a camera integrated in the vehicle 11.

In a further embodiment, the vehicle 11 can collect on its trajectory 12 information from different communication devices 9, 20 resp. select different devices. An alarm installation could thus be easily checked. In the case where a negative message is received (such as e.g. that a watchman was not at a certain place), an alarm could be triggered in a center. This vehicle 11 in this embodiment could also be used for competitions, polls etc.

On the other hand, depending on the use purpose this message could be billed or credited to the recipient of an electronic advertising announcement, i.e. he has to pay or is paid for this messaging. For this purpose, a module 5 for billing this received electronic advertising announcement is located in the memory area 4 of the message server 1. A corresponding module could also be available in the vehicle 11. The vehicle 11 could also change its route or direction upon instruction of a sender of an electronic advertising announcement. If someone for example wishes to rent the vehicle for advertising purposes, he could send instructions regarding the circle of recipients and the contents of the advertising announcement to be sent to the message server 1 or to the vehicle 11, and the latter effects the distribution of the advertisement in the manner described above. The sending of this electronic message to the vehicle 11 or to the message server 1 could be billed to this user or hirer of the vehicle 11, i.e. he would have to pay for this.

In a further embodiment, the vehicle 11 moves closer to a communication device 20 and checks resp. searches independently whether the communication devices 20 has a message to be sent, i.e. whether for example a file is stored in a certain register or whether a specially marked or said file is available. If this is the case and if the vehicle 11 detects this, it downloads the file, which can contain a film, a piece of music or another already described advertising announcement and distributes it in said fashion. It is not absolutely necessary for the user or the communication devices 20 to detect itself the control through the vehicle 11 or the downloading of the file.

A received electronic advertising announcement can be stored upon receipt in the memory area 4 of the message server 1 or in the memory area 14 of the vehicle 11. In a database 7 located in the memory area 4 of the message server 1, but which could also be in the vehicle 11, it is possible to also store the previously mentioned user profiles, wishes, routes etc. and the electronic advertising announcement would be sent only after comparison with this database 7. In the frame of the present invention, the vehicle 11 can send to other vehicles 11 located in the vicinity and/or receive from other vehicles 11 located in the vicinity electronic advertising announcements.

Advantageously, it is possible to send with the inventive method electronic advertising announcements, information news or voice messages to a large number of people having a corresponding mobile device 9 or a communication device 20 and who are in different locations. Since it is also possible to spontaneously modify the electronic message over the already mentioned message server 1, it is not necessary for the vehicle 11 to return to a base station to exchange or modify the advertisement to be sent or the information.

REFERENCE LIST

1 Message server in the telecommunication network 8
2 Module in the message server 1 for sending/receiving advertising announcements
3 Location determining system in the message server 1
4 Memory area in the message server 1
5 Module in the memory area 4 for billing
6 Module in the memory area 4 for determining the direction of the vehicle 11
7 Database in the message server 1
8 Telecommunication network
9 Communication device, mobile device
10 Identification module of the mobile device 9
11 Vehicle
12 Trajectory of the vehicle 11
13 Identification module of the vehicle 11
14 Memory area in the vehicle 11
15 Module in the memory area 14 for determining the direction of the vehicle
16 Sensor
17 Unit for determining the direction of the vehicle 11
18 Power supply unit of the vehicle 11
19 Interface on the vehicle 11 for sending/receiving advertising announcements
20 Communication device
21 Interface on the communication device 20 for sending/receiving advertising announcements

The invention claimed is:

1. A method for sending electronic advertising announcements, information, or news, by means of a controllable, moving, unmanned vehicle, the method including the steps of:
the vehicle moving in a network of communication devices in one direction; and
during said moving, when the vehicle moves close to a communication device, sending at least one of an electronic advertising announcement, and an information news item, to the communication device, wherein said sending is triggered by the vehicle itself or by another communication device.

2. The method of claim 1, wherein the vehicle sends the electronic advertising announcement or information news item, by means of an interface including one or more of Bluetooth, DECT, WLAN, and RFID to electronic communication devices located in the vicinity, wherein said communication devices include one or more of a computer, portable computer, headphones, mobile telephone, Bluetooth device, play console and PDA.

3. The method of claim 2, wherein the message server or the vehicle sends the advertising announcement or information news item as SMS, USSD, e-mail, IP packets, files, voice message, or web pages.

4. The method of claim 2, wherein the user of a mobile device or of a communication device must pay or is paid for receiving said advertising announcement or information news item from the message server and/or from the vehicle.

5. The method of claim 2, wherein a user of a mobile device or of a communication device sends an advertising announcement or information news item to the vehicle or to the message server for forwarding, and this is billed to the sender of this message.

6. The method of claim 5, wherein the advertising announcement or information news item is stored upon receipt in the message server or in the vehicle.

7. The method of claim 2, wherein the vehicle searches for an advertising announcement or information news item in a communication device and downloads it and forwards it to other communication devices.

8. The method of claim 2, wherein the vehicle sends to other vehicles located in the vicinity and/or receives from other vehicles located in the vicinity an advertising announcement or information news item.

9. The method of claim 2, wherein the vehicle moves along a predefined and preprogrammed route.

10. The method of claim 2, wherein the vehicle moves in a direction or along a route that changes or is adapted after certain events.

11. The method of claim 10, wherein the vehicle stores and processes certain recurring events and adapts its route or direction of movement accordingly.

12. The method of claim 10, wherein the vehicle changes its route or direction upon instruction of a sender of an electronic message.

13. The method of claim 10, wherein the vehicle moves in a direction or along a route where the density of the communication devices remains constant or increases.

14. The method of claim 10, wherein the vehicle moves in a direction or along a route where certain characteristics of the communication devices change.

15. The method of 1, wherein the vehicle is identified by a message server as said other communication device within a telecommunication network, wherein the message server detects the position of the vehicle and of mobile devices located in a vicinity of the vehicle and wherein the message server and/or the vehicle sends said advertising announcement or information news item, over the telecommunication network to said communication devices.

16. The method of claim 15, wherein the message server and/or the vehicle sends the advertising announcement or information news item, to all mobile devices located in the vicinity of the vehicle or only to the mobile devices located in the vicinity of the vehicle whose users have subscribed a certain service, who have a certain user profile or who have a certain characteristic.

17. The method of claim 15, wherein the message server and/or the vehicle sends the advertising announcement or information news item by means of an available telecommunication network including one or more of GSM, UMTS, TDMA, and CDMA.

18. The method of claim 1, wherein an airplane or micro aircraft, a helicopter or micro helicopter, a balloon, a car or a toy car, a boat or a robot moves as the vehicle along said route or in said direction.

19. The method of claim 1, wherein the vehicle draws attention to itself continuously or at certain pints in time during its movement with acoustic or optical means.

20. The method of claim 1, wherein the vehicle is powered with petrol, hydrogen, gas, by solar energy, batteries or accumulators and/or that the vehicle, to refuel, returns to a service station.

21. An unmanned vehicle for sending electronic advertising announcements or information news item, said vehicle having a memory area for storing the electronic advertising announcements or information news item and at least one interface for sending the electronic advertising announcements or information news item to another communication device.

22. The vehicle of claim 21, wherein said vehicle is provided with an interface such as Bluetooth, DECT, WLAN or RFID working at close range.

23. The vehicle of claim 21, wherein said vehicle is provided with a sending station with which the electronic advertising announcements or information news item can be sent within a telecommunication network to other mobile devices.

24. A method for sending recorded messages by means of a controllable, moving, unmanned vehicle, the method including the steps of:
- storing a predetermined message in a memory;
- moving the vehicle along a specified route;
- detecting when the vehicle is in a vicinity of one or plurality of communication devices, said communication devices using a public communications network;
- after said detecting, broadcasting, utilizing said public communications network, said stored message to at least one of said communication devices in the vicinity of said vehicle wherein, said stored message is at least one of an electronic advertising announcement, and an information news item.

25. The method of claim 24, further comprising the steps of:
- after said broadcasting, said vehicle continuing on said route;
- after said continuing, second detecting when the vehicle is in a vicinity of an additional one or plurality of communication devices, said additional one or plurality of communication devices using said public communications network;
- after said second detecting, second broadcasting, utilizing said public communications network, said stored message to at least one of said additional communication devices in the vicinity of said vehicle.

26. The method of claim 24, wherein said route is predefined and preprogrammed.

27. The method of claim 24, wherein said route changes upon receipt of an electronic message.

* * * * *